US006423234B1

(12) United States Patent
Martin

(10) Patent No.: US 6,423,234 B1
(45) Date of Patent: *Jul. 23, 2002

(54) AIR AND WATER PURIFICATION USING CONTINUOUS BREAKPOINT HALOGENATION

(75) Inventor: Roy Martin, Downers Grove, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,421

(22) Filed: Nov. 6, 2000

Related U.S. Application Data

(63) Continuation-in-part of application No. 09/260,809, filed on Mar. 2, 1999, now Pat. No. 6,143,184.

(51) Int. Cl.[7] .................................................. C02F 1/52

(52) U.S. Cl. ...................... 210/709; 210/712; 210/721; 210/725; 210/727; 210/730; 210/735; 210/743; 210/746; 210/756; 210/764; 210/908; 210/916; 210/752

(58) Field of Search ................................ 210/702, 712, 210/724, 725, 727, 730, 734, 735, 743, 746, 752, 709, 754–756, 758, 759, 764, 908, 916, 721

(56) References Cited

U.S. PATENT DOCUMENTS

| | | |
|---|---|---|
| 2,008,684 A | 7/1935 | Craddock |
| 2,212,260 A | 8/1940 | Brothman |
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |
| 3,252,689 A | 5/1966 | Blomgren, Sr. et al. |
| 3,319,937 A | 5/1967 | Wilson et al. |

(List continued on next page.)

FOREIGN PATENT DOCUMENTS

| | | |
|---|---|---|
| EP | 0 257 740 | 2/1988 |
| LU | 80951 | 2/1979 |

OTHER PUBLICATIONS

Kim, Yong H., "On the Activation of Polymeric Flocculants," AIChE Annual Spring Meeting, Houston, TX, Apr. 2–6, 1989.

U.S. Filer/Stranco, "Ryznar Stability Index The 3$^{rd}$ Dimension Needed for Proper 'Water Balance,'" Aquatic Technology Newsletter, vol. 1, No. 1, pp. 1–3.

U.S. Filer/Stranco, "Total Dissolved Solids, Friend or Foe?", Aquatic Technology Newsletter, vol. 1, No. 2, 1988; pp. 1–7.

U.S. Filter/Stranco, "The Relationship of ORP to PPM and Its Automated Control," Aquatic Technology Newsletter, vol. 1, No. 3, 1999, pp. 1–5.

U.S. Filter/Stranco, "The Chemistry and Control of Chloramines," Aquatic Technology Newsletter, vol. 1, No. 4, 1999, pp. 1–5.

U.S. Filter/Stranco, "Yes, Your Pool Needs Calcium Too," Aquatic Technology Newsletter, vol. 1, No. 5, pp. 1–3.

(List continued on next page.)

*Primary Examiner*—Peter A. Hruskoci
(74) *Attorney, Agent, or Firm*—Wolf, Greenfield & Sacks, P.C

(57) ABSTRACT

A process for optimizing the rate of oxidation using halogen, e.g. chlorine donors to prevent the accumulation of undesirable chlorinated by-products. The feed rate of a chlorine donor is controlled for maintaining a desired ORP. The amount of free halogen is reduced and the ORP range expanded by addition of an effective amount of a coagulating agent. The rate of oxidation is sufficient to prevent the accumulation of the undesirable by-products. Treatment removes the by-products from the water and surrounding air by maintaining continuous breakpoint halogenation conditions.

16 Claims, 4 Drawing Sheets

U.S. PATENT DOCUMENTS

| | | | |
|---|---|---|---|
| 3,389,970 A | | 6/1968 | Scheibel |
| 3,536,646 A | | 10/1970 | Hatch et al. |
| 3,559,959 A | | 2/1971 | Davis et al. |
| T896,051 I4 | | 3/1972 | Hamlin et al. |
| 3,702,298 A | * | 11/1972 | Zsoldos et al. ............. 210/759 |
| 3,742,735 A | | 7/1973 | Verreyne et al. |
| 3,747,899 A | | 7/1973 | Latinen, deceased et al. |
| 3,756,570 A | | 9/1973 | Bühner |
| 3,852,234 A | | 12/1974 | Venema |
| 4,016,078 A | | 4/1977 | Clark |
| 4,113,688 A | | 9/1978 | Pearson |
| 4,125,574 A | | 11/1978 | Kastner et al. |
| 4,146,676 A | | 3/1979 | Saeman et al. |
| 4,171,166 A | | 10/1979 | Trowbridge et al. |
| 4,217,145 A | | 8/1980 | Gaddis |
| 4,218,147 A | | 8/1980 | Rosenberger |
| 4,233,265 A | | 11/1980 | Gasper |
| 4,243,636 A | | 1/1981 | Shiraki et al. |
| 4,433,701 A | | 2/1984 | Cox et al. |
| 4,470,907 A | | 9/1984 | Seneza |
| 4,522,502 A | | 6/1985 | Brazelton |
| 4,550,011 A | | 10/1985 | McCollum |
| 4,575,678 A | | 3/1986 | Hladky |
| 4,648,043 A | | 3/1987 | O'Leary |
| 4,664,528 A | | 5/1987 | Rodgers et al. |
| 4,701,055 A | | 10/1987 | Anderson |
| 4,719,252 A | | 1/1988 | Dutton et al. |
| 4,747,978 A | * | 5/1988 | Loehr et al. ................ 252/175 |
| 4,752,740 A | * | 6/1988 | Steininger ................... 210/169 |
| 4,965,016 A | | 10/1990 | Saitoh et al. |
| 4,977,292 A | | 12/1990 | Hwa et al. |
| 5,004,549 A | | 4/1991 | Wood et al. |
| 5,018,871 A | | 5/1991 | Brazelton et al. |
| 5,030,334 A | | 7/1991 | Hale |
| 5,061,456 A | | 10/1991 | Brazelton et al. |
| 5,112,521 A | | 5/1992 | Mullins et al. |
| 5,130,033 A | * | 7/1992 | Thornhill .................... 210/754 |
| 5,135,968 A | | 8/1992 | Brazelton et al. |
| 5,139,627 A | | 8/1992 | Eden et al. |
| 5,164,429 A | | 11/1992 | Brazelton et al. |
| 5,213,694 A | | 5/1993 | Craig |
| 5,239,257 A | | 8/1993 | Muller et al. |
| 5,306,432 A | * | 4/1994 | Puetz .......................... 210/759 |
| 5,316,031 A | | 5/1994 | Brazelton et al. |
| 5,332,511 A | * | 7/1994 | Gay et al. ................... 210/755 |
| 5,382,367 A | | 1/1995 | Zinkan et al. |
| 5,494,588 A | | 2/1996 | LaZonby et al. |
| 5,683,654 A | * | 11/1997 | Pallmier et al. ............. 422/14 |
| 5,688,467 A | | 11/1997 | LaZonby et al. |
| 5,770,039 A | | 6/1998 | Rigney et al. |
| 5,785,867 A | | 7/1998 | LaZonby et al. |
| 5,800,732 A | | 9/1998 | Coughlin et al. |
| 5,814,233 A | * | 9/1998 | Starkey et al. ............. 210/759 |
| 5,820,256 A | | 10/1998 | Morrison |
| 5,849,985 A | * | 12/1998 | Tieckelmann et al. ...... 210/759 |
| 5,858,246 A | * | 1/1999 | Rafter et al. ................ 210/754 |
| 5,858,249 A | | 1/1999 | Higby |
| 5,882,526 A | * | 3/1999 | Brown et al. ............... 210/753 |
| 5,888,374 A | | 3/1999 | Pope et al. |
| 5,895,565 A | | 4/1999 | Steininger et al. |
| 5,902,751 A | | 5/1999 | Godec et al. |
| 5,947,596 A | | 9/1999 | Dowd |
| 5,972,196 A | | 10/1999 | Murphy et al. |
| 5,980,758 A | | 11/1999 | LaZonby et al. |
| 6,015,484 A | | 1/2000 | Martinchek et al. |
| 6,030,842 A | | 2/2000 | Peachy-Stoner |
| 6,045,706 A | | 4/2000 | Morrison et al. |
| 6,068,012 A | | 5/2000 | Beardwood et al. |
| 6,132,593 A | | 10/2000 | Tan |
| 6,143,184 A | * | 11/2000 | Martin et al. ............... 210/743 |
| 6,146,538 A | | 11/2000 | Martin |
| 6,149,819 A | * | 11/2000 | Martin et al. ............... 210/743 |
| 6,315,950 B1 | | 11/2001 | Harp et al. |

OTHER PUBLICATIONS

U.S. Filter/Stranco, "Why Do I Have Algae In My Pool?" Aquatic Technology Newsletter, vol. 1, No. 6, 1999, pp. 1–2.

Carpenter, Colleen et al., "Chlorine Disinfection of Recreational Water for *Cryptosporidium parvum,*" Emerging Infections Diseases, vol. 5, No. 4, Jul.–Aug. 1999, pp. 579–584.

U.S. Filter, Stranco, "ECS–Pool (w/CHF–150) Engineering Packet," Apr. 22, 1999.

Kowalsky, L., "Pool–Spa Operators Handbook," National Swimming Pool Foundation, 1983–1990.

Lynntech, Inc., "Electrochemical Ozone Generator," Model 124 Product Literature (date unknown).

U.S. Filter/Stranco, "Strantrol Automated Water Chemistry Control for Commercial Pools," 1998.

U.S. Filter/Stranco, "Strantrol System 3 Pool & Spa Chemistry Controller," 2000.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

Kloberdanz, B., "The Air in There: Enhancing an Indoor Pool Environment," Recreation Management, 2000.

Selvick, E., "Take Control of 'Yo–Yo' Treatment Cycles," International Aquatics, National Trade Publications, Inc., Jul./Aug. 1997.

Frazier, B., "Automation to the Rescue," Aquatics International, May/Jun. 1998.

Batt, T. et al., "The Water Down Under," Parks & Recreation, Nov. 1999.

Krone, D., "Automated Water Chemistry Control at University of Virginia Pools," Facilities Manager, vol. 13, No. 6, Nov./Dec. 1997.

U.S. Filter/Stranco, "Remote Monitoring for Unstaffed Pools," Parks & Recreation, Nov. 1997.

Minton, E., "On the Waterpark," Swimming Pool/Spa Age (date unknown).

U.S. Filter/Stranco, "Environmental Control at Indoor Pool: New ECS System Eliminates Chronic Air Quality Woes For New York School District Pool," Stranco Products Capsule Case History #806, Jul. 1998.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environmental Control at Indoor Pool: ECS System Optimizes Air & Water Quality at Texas School District Swim Center," Stranco Products Capsule History #811, Nov. 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, 1999.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Air & Water Quality Control for Indoor Aquatic Facilities," U.S. Filter Corporation, 1998.

U.S. Filter/Stranco, "Strantrol ECS—Environmental Control System (For Pool)," 2000.

U.S. Filter/Stranco, "Abstracts of Strancol ECS Case Histories," (date unknown).

Williams, K., "Aquatic Facility Operator Manual," National Recreation and Park Association, Second Edition, 1995.

Normenausschusse Wasserwesen, "Treatment and disinfection of water used in bathing facilities," DIN 19643–4, Feb. 1999.

Normenausschusse Wasserwesen, "Treatment and disinfection of water used in bathing facilities," DIN 19463–3, Apr. 1997.

Normenausschusse Wasserwesen, "Treatment and disinfection of water used in bathing facilities," DIN 19463–2, Apr. 1997.

Normenausschusse Wasserwesen, "Treatment and disinfection of water used in bathing facilities," DIN 19643–1, Apr. 1997.

Stranco, "The Best of Poolfax," The Poolfax Newsletter, 1981–1984.

Victorin et al., "Redox potential measurements for determining the disinfecting power of chlorinated water," *J. Hyg., Camb.*, 70, 1972, pp. 313–323.

U.S. Filter/Stranco, "Environmental Control System Training Meeting, Mar. 15, 2000".

Kim, Yong H., "Evaluation of Redox Potential and Chlorine Residual as a Measure of Water Disinfection," presented at the 54th International Water Conference, Pittsburgh, PA, Oct. 11–13, 1993.

Scully et al., Disinfection Interference in Wastewaters by Natural Organic Nitrogen Compounds, *Environ. Sci. Techn.*, vol. 30, No. 5, 1996, pp. 1465–1471.

White, Geor. Clifford, Handbook of Chlorination and Alternative Disinfectants, Third Edition, (date unknown), pp. 801, 803–809, 922–924.

Carlson, S., "Fundamentals of water disinfection," *J. Water SRT—Aqua*, vol. 40, No. 6, (1991), pp. 346–356.

Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer–Verlag, (1961), pp. 100–110.

Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer–Verlag, (1961), pp. 330–342.

Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–13.

Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer–Verlag, (1963), pp. 1–18.

Stranco, "Solutions: Effluent Dechlorination", Stranco Product Literature (date unknown).

Hensley, R. et al., "Disinfection Metamorphosis: From Chemicals to Control," *Operations Forum*, vol. 12, No. 4, Apr. 1995.

Hetzler, J.T. et al., "ORP: A Key to Nutrient Removal," *Operations Forum*, vol. 12, No. 2, Feb. 1995.

Bossard, G. et al., "Optimizing Chlorination/Dechlorination at a Wastewater Treatment Plant," reprinted from *Public Works*, Jan. 1995.

Eddington, Gordon, "Successfully Managing Wastewater Chlorination," Stranco Product Literature (date unknown).

Ryan, D. et al., "Waste Not, Want Not: Avoiding Chemical Excesses," reprinted from *Operations Forum*, vol. 11, No. 4, Apr. 1994.

D'Adam, D. et al., "A Case Study of Wastewater Plant Disinfection," reprinted from *Public Works Magazine*, Nov., 1994.

"Louisiana Plant Uses New Technology for Dechlorination," reprinted from *American City & County*, Feb. 1994.

Kiser, P. et al., "ORP or Residual: Which Measures Oxidation?" Sep. 10, 1992, pp. 1–7.

"Aquasol Controllers: Chemical Automation for Pools and Spas," Product Literature (date unknown).

"Pool and Spa Controller: Acu–200 Pool Management Software," Product Literature (date unknown).

"Acu–Trol Programmable Controllers," Product Literature from www.acu–trol.com, printed Nov. 19, 1999.

Santa Barbara Control Systems, "Chemtrol™ PC Programmable Controllers: Integrated Water Treatment with Remote Control," Product Literature, (date unknown).

"Chemtrol Automatic Pool Controllers," Product Literature from www.sbcontrol.com, printed Nov. 19, 1999.

"Chemtrol—PC6000 Controller," Product Literature from www.sbcontrol.com, printed Nov. 19, 1999.

"Chemtrol—PC3000 Controller," Product Literature from www.sbcontrol.com, printed Nov. 19, 1999.

"AK100 Swimming Pool Control Systems," Product Literature from www.acu–trol.com, printed Nov. 19, 1999.

Acu–Trol, "AK100 Series" Product Literature (date unknown).

Acu–Trol, "Acu–Trol Programmable Controllers: AK100 Series and AK200," Product Literature (date unknown).

Aquasol Controllers, Inc., "Aquasol WTC," Product Literature, (date unknown).

Aquasol Controllers, Inc., "What is a Controller?" Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol Controllers, Inc., "Aquasol SPC Specifications," Product Literature from www.aquasol.com, printed Nov. 19, 1999.

Acu–Trol, "AK100 Summary," Product Literature from www.acu–trol.com, printed Nov. 19, 1999.

CAT Controllers, "CAT 2000+ Programmable Water Chemistry Controller," Product Literature (date unknown).

Rola–Chem Corporation, "The New Wave in Water Management: Take Control with Rola–Chem," Product Catalog, Apr. 1999.

Strand, R. et al., "ORP As a Measure of Evaluating and Controlling Disinfection in Potable Water," (Source and date unknown).

Mansfeld et al., "Electrochemical Noise Analysis of Iron Exposed to NaCl Solutions of Different Corrosivity," *J. Electrochem. Soc.,* vol. 141, No. 5, May 1994, pp. 1402–1404.

Brusamarello et al., "Analysis of Different Methods to Calculate Electrochemical Noise Resistance Using a Three–Electrode Cell," *Corrosion,* vol. 56, No. 3, Mar., 2000, pp. 273–282.

Mansfeld et al., "Electrochemical Noise Analysis of Iron Exposed to NaCl Solutions of Different Corrosivity," *J. Electrochem. Soc.,* vol. 140, No. 8, Aug. 1993, pp. 2205–2209.

\* cited by examiner-

AIR AND WATER PURIFICATION USING CONTINUOUS BREAKPOINT HALOGENATION

This invention is a Continuation-in-Part of U.S. application Ser. No. 09/260,809, filed Mar. 2, 1999, now U.S. Pat. No. 6,143,184, the contents of which are herein incorporated by reference.

FIELD OF THE INVENTION

This invention relates to the maintenance of aquatic facilities, particularly to the optimization of the feed rate of an oxidizer/sanitizer to eliminate the accumulation of undesirable halogenated compounds, thereby increasing water and air quality within such facilities, and most particularly to the incorporation of a coagulant effective to reduce oxidizer demand.

BACKGROUND OF THE INVENTION

The use of closed recirculating water reservoirs for use by the general public, for example, swimming pools, spas, hot tubs, decorative fountains, cooling towers and the like, has led to a variety of water quality problems. For instance, improper chemical balances in the water can lead to various types of contamination including bacterial and viral contamination.

The use of chemical oxidizers/sanitizers is a fairly standard water sanitation method. Addition of so-called halogen donor compounds, such as chlorine and bromine are effective sanitizers so long as they are maintained at well defined and constantly controlled concentration levels in the water. It is important that the concentration of these chemical sanitizers is not allowed to become too high which may cause irritation to the users and damage to the water system. Insufficient sanitizers result in a contaminated condition.

The difficulties in maintaining a proper balance of sanitizers may arise from numerous load factors that are difficult, if not impossible, to predict. For instance, in a pool the load factor is typically caused by varying numbers of users. In hot tubs the use of air jets and high water temperatures tend to destroy or remove the sanitizer from the water. Cooling towers are subject to environmental conditions, such as fluctuations in temperature. Indoor decorative fountains may be affected by the air quality in the building, while the fountain water can also affect the air in the building.

Various testing devices exist for determining the chemical balance of the water of pools, spas and the like, for example, colormetric chemical test kits are available that utilize liquid droplets, test strips or tablets which dissolve in the water to indicate a particular level or concentration of sanitizing agents. By removing a test sample of water, for example via a scoop or cup, a seemingly representative sample is deemed to have been taken. A staining agent is then added by means such as an eye dropper or the like. The degree of staining relates to the amount of sanitizer in the water. The amount of sanitizer present is determined by visually comparing the degree of coloring of the test sample against a test scale previously formulated. Further complicating the task of maintaining sanitary conditions in such bodies of water is the fact that studies now indicate there is little correlation between the free halogen, e.g. chlorine, residual readings which are normally used to monitor such bodies of water and the actual bacteriological quality of the reservoirs themselves. Pool and spa maintenance officials have long gone under the assumption that maintaining a free chlorine residual of two milligrams per liter or two parts per million will insure a safe water condition. Thus, the parts per million reading which is determined via the stain comparison, is actually a reflection of the sum of the free chlorine and combined chlorine compounds such as chloramine which are present in the water. These combined chlorine derivatives do not protect from bacteria and/or viral contamination. Additionally, since organic and chemical loading drastically reduce the ability of free chlorine to overcome bacteria, the available free chlorine test kits are of questionable value unless the exact levels of organic contaminants and the particular pH of the water being tested is known.

U.S. Pat. No. 4,752,740 suggests the use of monitoring the oxidation-reduction potential (ORP) as a method of measuring the sanitization levels of water. ORP defines the potential of a sanitizer such as chlorine, bromine or ozone to react with various contaminants. These compounds are known as oxidizers and have the property of "burning off" impurities in the water, for example, body wastes, algae and bacteria. The use of an ORP sensor allows the pool maintenance engineer to measure the potential generated by the active form of the sanitizer and not the inactive forms such as the combined chlorine derivatives. Additionally, ORP monitoring has an advantage in that it is an ongoing electronic process requiring no test chemicals or agents and monitoring of sanitation levels is constantly performed as opposed to being performed on some predetermined schedule basis. Since the potential for disease transmission due to organic loading is far more significant in public spas and pools, use of ORP measurement could be of great benefit in reducing the risk of contamination and disease transmission.

In accordance with standards set forth by the World Health Organization in 1972, maintenance of an ORP level of 650 millivolts is deemed to result in a water supply that is disinfected and in which viral inactivation is virtually instantaneous.

Chlorine is the most widely used oxidizer in the aquatic industry, the primary use being for sanitation of the water in pools and spas. Chlorine, being an oxidizer, is also involved in oxidation reactions with organic and nitrogen based substances such as urea, uric acid, amino acids etc. One of the drawbacks of chlorine is the production of chlorinated by-products which produce undesirable side effects such as irritation of the eyes, sinuses, skin, foul smelling air, and corrosion of air handling equipment. Numerous attempts have been made at addressing this problem. "Shocking" of the pool water requires dosing the water with stoichiometric concentrations of chlorine to oxidize these substances. One problem with this method is that there cannot be any bathers present due to the excessive concentrations of chlorine required to meet the stoichiometric levels needed when the undesirable substances have been allowed to accumulate. Another issue this method addresses is the problem after the symptoms have appeared (i.e., high combined chlorine, foul odors, etc.). Also, in many cases this method fails to rid the water and air of these substances since the concentration of chlorine required is at best a rough estimate (incorporates measuring the combined chlorine in the water). Measuring the concentration of combined chlorine in the water does not take into consideration the accumulated demand that is non-aqueous, e.g. accumulated on the filter media, walls of the pools, etc. As the chlorine levels rise, some of this accumulated demand is liberated, thereby preventing the chlorine from reaching the necessary stoichiometric levels. This prevents the water from reaching "breakpoint".

Ozone has been used as a side stream treatment to destroy these undesirable substances. While it is an effective sanitizer, ozone cannot be applied to the bulk water of the pool where the contaminants are being added. Furthermore, since ozone cannot maintain a residual concentration in the body of water, it cannot be used as a stand-alone treatment, chlorine or bromine is used as the primary sanitizer. Besides being expensive and often requiring extensive de-ozonation equipment, e.g. as activated carbon, ozone destroys chlorine by attacking the hypochlorite ions, thereby further increasing operational and maintenance cost.

Bromine is sometimes used in place of chlorine because of the belief that it does not produce the air fouling by-products produced by chlorine. However, while bromamines are not as volatile as chloramines, they do possess an odor and irritate the eyes. Bromine also requires an oxidizer such as chlorine or ozone to activate the bromide ion. Operating costs tend to be high and it is often difficult to maintain water quality since no easy methods are available for differentiating between free or combined bromine. Also, hydantoin, an additive commonly used to pelletize the bromine chlorine combination, reduces the oxidizing power of the bromine as the hydantoin accumulates in the water. This makes it more difficult to reduce the accumulation of undesirable brominated compounds.

ORP is a qualitative measurement of the oxidation or reduction power and has been used in aquatics since 1972 when the Stranco Company introduced these systems to the industry. Despite the use of ORP controllers, the varying load factors are difficult to instantly react to and the control of air and water quality continues to be a problem at indoor aquatic facilities.

While ORP has been established as the primary indicator for determining the inactivation rates of various bacteria and viruses, dosing aquatic water with part per million (PPM) measurement of chlorine has been the accepted method used for meeting the oxidation needs of aquatic facilities. For example, while 650 mv is commonly used as the minimum required oxidation potential to ensure sanitized conditions in a pool or spa, the health departments nevertheless requires PPM levels of chlorine.

Despite maintaining health department levels of chlorine and/or operating with ORP levels in excess of 650 mV, following prescribed methods of superchlorination (breakpoint chlorination) as described on the product literature and in the "Certified Pool Operators" (CPO) training course, the problems resulting from incomplete oxidation are widespread.

Thus, there exists a need for a method of reducing or eliminating impurities present in the air and water associated with aquatic facilities while maintaining the required levels of sanitization, and simultaneously reducing oxidizer demand by reducing or removing the amount of soluble (reactive) organic demand present within the system.

SUMMARY OF THE INVENTION

This invention teaches a system and process for optimizing the rate of oxidation using halogen donors to prevent the accumulation of undesirable halogenated by-products, e.g. chloramines and bromamines. By controlling the feed rate of a halogen donor such as chlorine to maintain the desired ORP, the rate of oxidation is sufficient to prevent the accumulation of the undesirable by-products. Also, by incorporating this application at an indoor aquatic facility, the effects of poor air and water quality can be reversed, thereby removing the by-products from the air and water.

The process optimizes the ORP by incorporating the necessary process control and feed equipment to sustain a set-point thereby controlling the concentration of undesirable by-products in the water.

The process additionally teaches the step of feeding coagulating agents to neutralize the charge density of water-soluble organic complexes thereby making them water-insoluble. The water insoluble precipitates are separated from the oxidizers utilizing: settling, filtration, flocculation (agglomeration) followed by settling, or flocculation followed by filtration.

An objective of the invention is to eliminate volatile halogenated compounds from water and air by maintaining a level of oxidation potential. Halogen feed rates can be controlled to prevent or even reverse the accumulation of combined halogen and other halogenated volatile compounds which contaminate the air and water of aquatic facilities, in particular indoor aquatic facilities. Furthermore the demand for oxidizers is substantially reduced by incorporation of a coagulating agent effective to reduce the demand for oxidizers by reducing the soluble (reactive) organic demand from the system.

Another objective of the invention is to teach a process of operating an aquatic facility under conditions of "Continuous Breakpoint Halogenation".

Yet another objective of the invention is to improve the air quality around closed water systems by removal of halogenated compounds through re-absorption followed by oxidation thereof with, e.g. HOCL.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
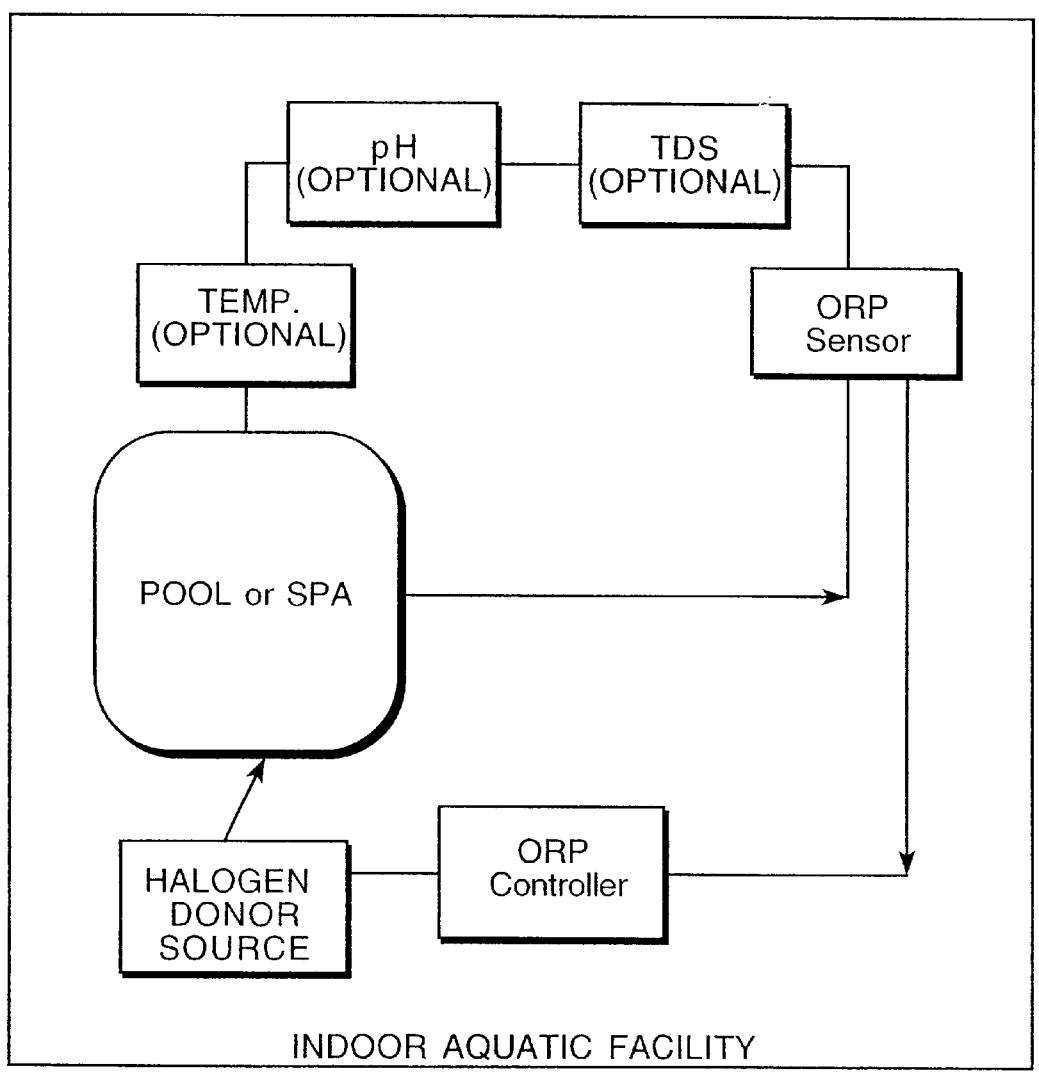
FIG. 1 is a diagrammatic representation of the process of the instant invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Referring to FIG. 1, a typical indoor aquatic facility is characterized. Water from the pool or spa flows past an ORP sensor. Optionally, the water may further flow past a sensor which measures total dissolved solids (TDS), temperature and pH. Output from the ORP sensor is transmitted to a controller which calls for the addition of a halogen donor source to the pool water in accordance with selected process parameters.

This invention incorporates optimizing the rate of oxidation using halogen donors to prevent the accumulation of undesirable halogenated by-products. By controlling the feed rate of a halogen donor, e.g. gaseous chlorine, calcium hypochlorite, sodium hypochlorite, lithium hypochlorite and bromine or mixtures thereof, to maintain the desired ORP, the rate of oxidation is maintained at a level sufficient to prevent the accumulation of the undesirable by-products. Also, by incorporating this application in an indoor aquatic facility, the effects of poor air and water quality can be reversed, thereby removing the by-products from the air and water.

It has been demonstrated that by optimizing the ORP to between 750–850 mV, preferably 760–800 mV, and by incorporating the necessary process control and feed equipment to sustain this set-point, the rate of oxidation in the water is sufficient to control the concentration of undesirable by-products in the water. Furthermore, by sustaining these conditions, the conditions of poor air and/or water quality resulting from the presence of these undesirable by-products can be reversed. In an alternative embodiment, total dissolved solids (TDS) and pH are simultaneously monitored.

This invention ensures a sustained high rate of oxidation in the bulk water of the pool or spa despite the presence of accumulated demand. It has been found that the undesirable by-products cannot be sustained in an environment possessing this level of oxidation potential, even with concentration far exceeding that experienced in aquatic facilities. Therefore, by implementing this invention, the aquatic facility will be operating under conditions of "Continuous Breakpoint Halogenation".

By operating in accordance with the process conditions described, the by-products produced during the initial step of oxidation are not allowed to accumulate. The by-products are an intermediate step in the continuing process of oxidation. While these by-products are initially produced, they are not allowed to accumulate, and shortly thereafter, are destroyed by the continued oxidation. By preventing the accumulation of these volatile by-products, their respective partial pressures are minimized, and the problems of poor air quality are reduced or eliminated. Also, in aquatic facilities that currently experience these problems, by implementing this application, the problems of poor air quality resulting from these halogenated compounds can be reversed through re-absorption of the volatile chlorinated compounds, followed by oxidation by, e.g. HOCL. The dynamics of the re-absorption process proceed according to Henry's Law of Diffusion.

It has been demonstrated in both laboratory and field testing that chloramines such as monochloramine have a buffering effect on the ORP. Chlorine demand by definition is something that consumes chlorine over some period of time. Chloramines require stoichiometric levels of hypochlorous acid to initiate oxidation. Unless the stoichiometric levels of HOCL are present, the chlorine is not consumed by oxidation reactions.

While combined chlorine does not place a demand on the chlorine until stoichiometric levels are achieved, it has a buffering effect on the ORP value provided by the HOCL. This buffering effect makes it more difficult to achieve ORP levels of approximately 780–800 mV, depending on the concentration of combined chlorine, as long as combined chlorine is present. By incorporating ORP control with a set-point of 760–800 mV, chlorine is fed to the water until the ORP is reached. As long as combined chlorine is present, the value is difficult to reach. This buffering effect induces the rise in free chlorine levels. At this point, the rate of oxidation reactions increases, and the combined chlorine and other chlorinated compounds are oxidized.

This development is important to the aquatics industry since its implementation means chlorine feed rates can be controlled to prevent or even reverse the accumulation of combined chlorine and similar halogenated volatile compounds which contaminate the air and water of aquatic facilities, in particular indoor aquatic facilities.

The instant invention provides additional improvement over the instant inventor's prior teachings by calling for the feed of coagulating agents used to neutralize the charge density of water-soluble organic complexes thereby making them water-insoluble. The water insoluble precipitates are separated from the oxidizers utilizing: settling, filtration, flocculation (agglomeration) followed by settling, or flocculation followed by filtration.

In field trials, this improvement has significantly reduced the demand for oxidizers by removing the soluble (reactive) organic demand from;:the presence of the oxidizers. This practice significantly reduced the use of oxidizers needed to oxidize the contaminants added to the pool to maintain air and water quality. Also, this improvement significantly reduced the concentration of free chlorine to maintain the ORP, while reducing the combined chlorine measured in the water.

This improvement can enhance the existing described art, while further expanding the operating range of ORP to achieve continuous break-point halogenation. By reducing the organic nitrogen load (lower combined chlorine), lower concentrations of chlorine can be utilized to achieve the same result. Because free chlorine concentration is controlled by ORP, lower ORP set-points can be employed where desired while achieving continued Break-Point Halogenation (Stoichlometric based chemistry) without compromising performances. ORP range should be 700–850 mV, when utilizing this method.

Useful coagulants include Alum, poly-aluminum chloride, sodium aluminate, polyamines, polyquaternary compounds, polydiallyl-dimethyl ammonium chloride, chitosan (poly-D-glucosamine) and chitin (poly-n-acetyl-D-glucosamine) alone or in any combination.

Dosage rates are 0.01 ppm–10 ppm. The coagulant may be fed to the system by any known method effective to introduce the coagulant to the water treatment system, such as low level continuous feed, feed on demand, e.g. ORP activated, and periodic feed under timer based control.

The objective is to feed polymer to the system to convert water soluble organics into water-insoluble organics thereby allowing separation from the oxidizer. Reduced organic demand on oxidizer enhances the oxidation potential of the oxidizer and further enhances efficient continuation of breakpoint halogenation.

The polymer is fed at a sufficient frequency and level of concentration to allow for halogen to remain in optimum range while sustaining desired ORP, e.g. within the range of 700 mv–850 mv with chlorine levels in the range of 0.1 ppm–10 ppm.

EXAMPLE 1

A testing device was designed and built to simulate the water and air environment of an indoor aquatic facility. The system was designed to control the following:

$H_2O$ temperature;

Air circulation rates;

Air exchange rates;

Water turnover rates (filtered water);

Water exchange rates

Figure 4:
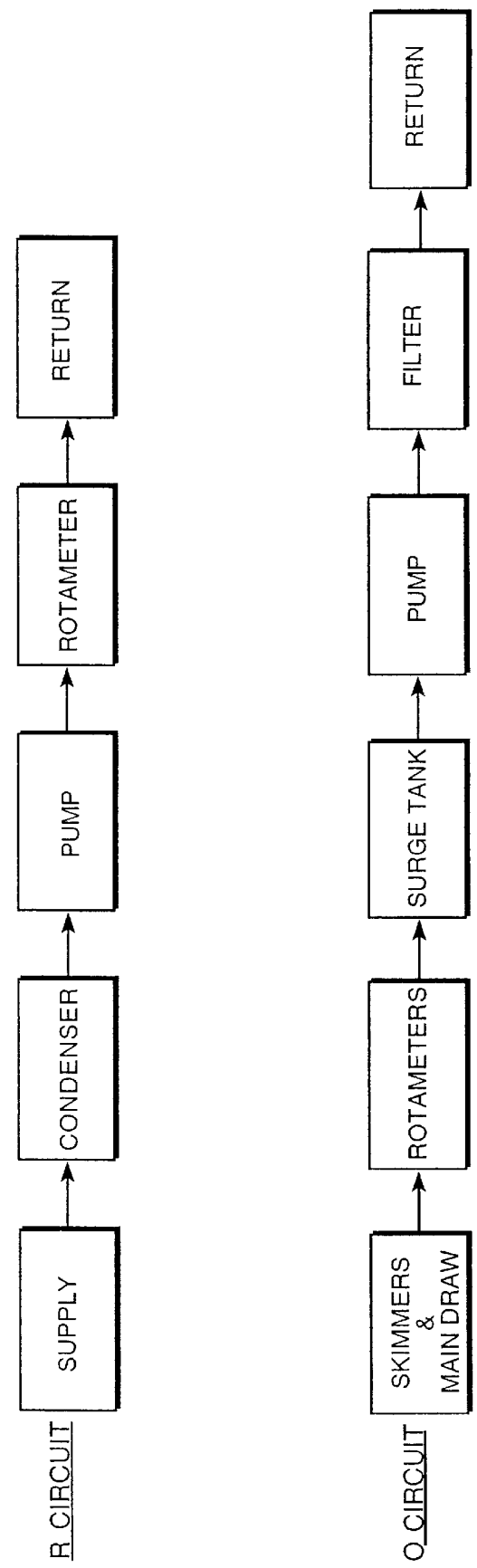
FIG. 4 is a Circuit Diagram of the Air and Water Flow in the test device according to Example 1.

FIG. 4 represents a circuit diagram of air and water flow through the test device.

Instrumentation for automatic monitoring and recording of ORP and pH were incorporated.

A condenser was installed in the air circulation system. The condenser allowed for scheduled sampling of the condensate.

A micro-titration system was incorporated for precise feed of various reagents for adjusting ORP, pH, etc.

The test device was initially prepared for use by the addition of water to 50% of the skimmer line. The tank representing the surge pit was filled to 50%. The tank lid was sealed.

Condensate samples were collected by chilling the air prior to the air circulation pump. Condensate was collected for 20 minutes, the measured sample was tested using standard DPD methods for chlorine that incorporated a HACH DR2000 spectrophotometer.

Laboratory grade ammonium chloride was used as the nitrogen source for the generation of chloramines. A measured amount was added to the water of the test device. The water and air circulation pumps were activated and adjusted to achieve desired circulation and exchange rates.

A measured dosage of chlorine in the form of 5.25% liquid bleach was added to the water to induce the formation of combined chlorine. After providing sufficient contact time, incremental dosages of bleach were added to achieve and sustain the desired ORP of 800 mV.

Condensate and water samples were periodically tested for free and total chlorine using standard methods. ORP and pH readings were also recorded.

Table 1 illustrates the rate of chloramine removal from the air (and subsequent water). Sustaining the ORP at 800 mV with addition of a halogen donor (chlorine), the concentration of chloramines in the air was continually reduced over the test period. During the test period, the concentration of chloramines in the water was sustained, but did not accumulate. Mass balances support the destruction of chloramines in the water equal to the rate of chloramine reduction in the condensate. The absorption of chloramines by the water follows Henry's Law.

TABLE 1

| Lapsed Time (minutes) | ppm combined (water) | ppm combined (condensate) |
| --- | --- | --- |
| 0 | 1.57 | |
| 25 | 1.18 | |
| 70 | 0.56 | |
| 130 | 0.20 | 3.12 |
| 270 | 0.35 | 1.36 |
| 315 | 0.25 | |
| 375 | 0.30 | 0.92 |

EXAMPLE 2

Field Trial

A 95,000 gallon indoor pool facility had experienced chronic problems with air and water quality resulting from high concentrations of chloramines in both the air and water. The water treatment system incorporated an ORP controller and used 12% liquid bleach as the oxidant and sanitizer.

Superchlorination methods following industry standards were frequently incorporated in an attempt to reach breakpoint conditions, thereby ridding the facility of poor air and water quality. Complaints of skin irritation, rashes and burning eyes were common. Based on operator log sheets, combined chlorine levels were constantly ≧0.5 ppm even after superchlorination.

Figure 2:
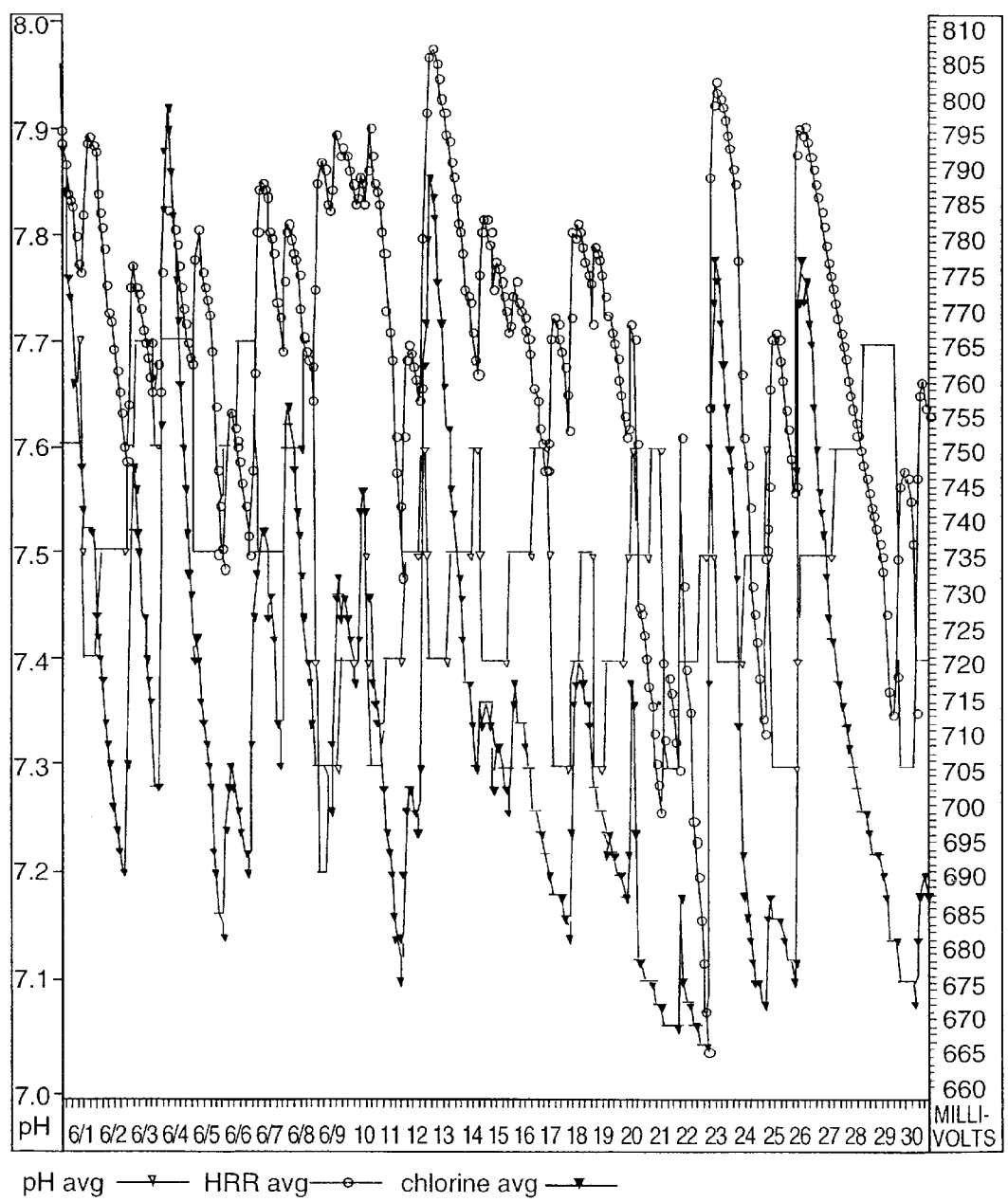
FIG. 2 is a graphical representation of actual field conditions at the facility described in Example 2 prior to incorporating the teachings of the instant invention.
Figure 3:
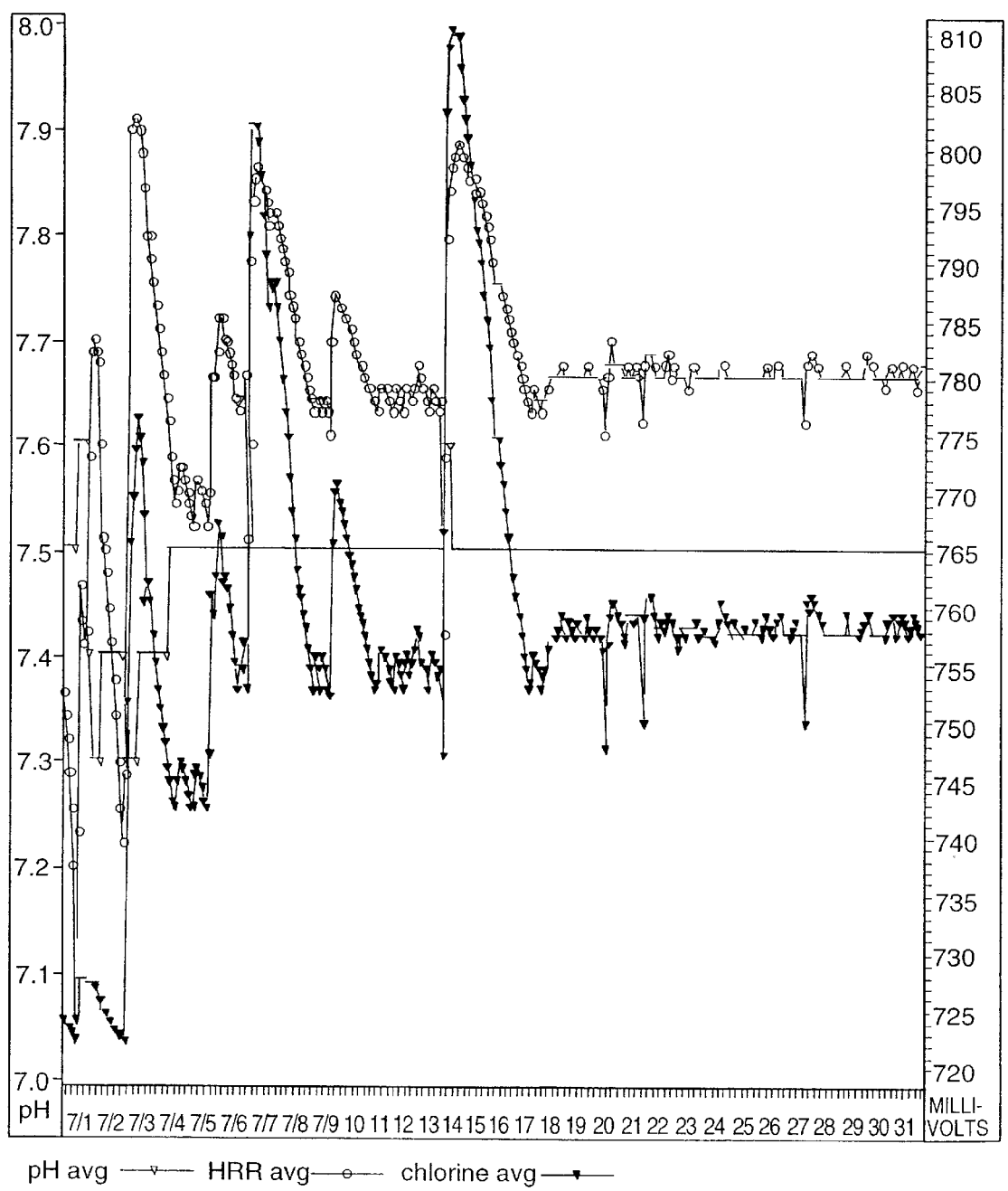
FIG. 3 is a graphical representation of actual field conditions at the facility described in Example 2 subsequent to incorporating the teachings of the instant invention.

Control of the water chemistry at the facility was initiated in accordance with the teachings of the instant invention. ORP and pH were automatically controlled and recorded and a graphical representation of the results before and after implementation of the instant process are shown in FIGS. 2 & 3 respectively. The ORP set-point was 780 mV with a pH setting of 7.5. Chlorine concentrations and feedrates were controlled based on ORP. The free chlorine levels were measured using standard DPD methods, and generally ranged between 7–10 ppm while sustaining the targeted ORP. After 7 days of operation, the combined chlorine concentration in the pool water was recorded as 0.0 using DPD calorimetric test. After 10 days, odors resulting from the presence of chloramines had been eliminated. After more than 4-months of continued operation the air remains free of any chloramine associated odors; furthermore, the process of superchlorination has been eliminated.

LABORATORY STUDIES

Laboratory grade glycine was added to a water sample to achieve about 62 ppm as glycine. Chlorine, in the form of calcium hypochlorite, was added to achieve 0.8 ppm free chlorine measured using standard DPD methods.

The corresponding chemistry was:

pH—7.95

ORP—360 mv

Free Chlorine—0.8 ppm 100 ppm of a 50/50 blend (as $Al_2O_3$) of Alum and PAC (poly-aluminum chloride) was added to the system.

Almost immediately, the water appeared hazy due to the formation of insoluble particulate matter. After 60 seconds, the ORP was measured to be 455 mv. Removal of the soluble organics by precipitation with coagulation reduced chlorine demand and increased the oxidation potential of the solution. Similar increases in oxidizer efficiency due to coagulation will occur at breakpoint halogenation conditions yielding an effective range of ORP of about 700 mv–850 mv.

Although the invention is described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A process for removing volatile halogenated compounds including chloramines and/or bromamines from the air and treating a body of water in an indoor aquatic facility comprising:

disposing an oxidation-reduction potential (ORP) sensor in fluid communication with a body of water within said facility;

continuously monitoring said body of water's ORP;

comparing the monitored ORP to a set-point value calculated to be within an effective range to permit oxidation of said volatile halogenated compounds wherein the effective range of ORP is from 700 mv–850 mv;

adding a halogen donor source in an amount and at a rate sufficient to realize a monitored ORP within said range wherein said halogen donor source is selected from the group consisting of calcium hypochlorite, sodium hypochlorite, lithium hypochlorite, and mixtures thereof;

regulating the rate of addition of said halogen donor source to maintain the ORP within said effective range;

feeding a coagulating agent in an amount effective to reduce the amount of halogen donor required to maintain the ORP within said effective range; reabsorbing said volatile halogen compounds within said body of water; and oxidizing the reabsorbed compounds.

2. The process according to claim 1 further including the step of monitoring pH.

3. The process according to claim 1 wherein the coagulating agent is selected from the group consisting of alum, poly-aluminum chloride, sodium aluminate, polyamines, polyquaternary compounds, polydiallyl-dimethyl ammonium chloride, chitosan (poly-D-glucosamine) and chitin (poly-n-acetyl-D-glucosamine) alone or in any combination.

4. The process according to claim 1 wherein the coagulating agent is fed at a rate and in an amount effective to provide a concentration level of 0.1 ppm–10 ppm.

5. The process according to claim 1 wherein the coagulant is fed by a continuous feed process.

6. The process according to claim 1 wherein the coagulant is fed by a feed on demand process.

7. The process according to claim 1 wherein the coagulant is fed by an ORP activated process.

8. The process according to claim 1 wherein the coagulant is fed by a periodic feed under timer based control process.

9. A process for removing dissolved halogenated compounds including chloramines and/or bromamines from circulating water systems comprising:

disposing an oxidation-reduction potential (ORP) sensor in fluid communication with said circulating water system;

continuously monitoring the ORP of said system;

comparing the monitored ORP to a set-point value calculated to be within an effective range to permit oxidation of said halogenated compounds wherein the effective range of ORP is from 700 mv–850 mv;

adding a halogen donor source in an amount and at a rate sufficient to realize a monitored ORP within said effective range wherein said halogen donor source is selected from the group consisting of calcium hypochlorite, sodium hypochlorite, lithium hypochlorite, and mixtures thereof;

feeding a coagulating agent in an amount effective to reduce the amount of halogen donor required to maintain the ORP within said effective range; and regulating the rate of addition of said halogen donor source to maintain the ORP within said effective range;

wherein said halogenated compounds are continually oxidized.

10. The process according to claim 9 further including the step of monitoring and/or controlling pH.

11. The process according to claim 9 wherein the coagulating agent is selected from the group consisting of alum, poly-aluminum chloride, sodium aluminate, polyamines, polyquaternary compounds, polydiallyl-dimethyl ammonium chloride, chitosan (poly-D-glucosamine) and chitin (poly-n-acetyl-D-glucosamine) alone or in any combination.

12. The process according to claim 9 wherein the coagulating agent is fed at a rate and in an amount effective to provide a concentration level of 0.01 ppm–10 ppm.

13. The process according to claim 9 wherein the coagulant is fed by a continuous feed process.

14. The process according to claim 9 wherein the coagulant is fed by a feed on demand process.

15. The process according to claim 9 wherein the coagulant is fed by an ORP activated process.

16. The process according to claim 9 wherein the coagulant is fed by a periodic feed under timer based control process.

* * * * *